(12) United States Patent
Homer et al.

(10) Patent No.: US 7,301,783 B2
(45) Date of Patent: Nov. 27, 2007

(54) COMPUTING DEVICE HAVING AN ANTENNA

(75) Inventors: Steven S. Homer, Tomball, TX (US);
Paul J. Doczy, Cypress, TX (US);
Mark C. Solomon, Cypress, TX (US);
Stacy Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/235,359

(22) Filed: Sep. 5, 2002

(65) Prior Publication Data

US 2004/0047139 A1    Mar. 11, 2004

(51) Int. Cl.
*H05K 9/00* (2006.01)
*H05K 5/00* (2006.01)
(52) U.S. Cl. ...................................... 361/816; 361/683
(58) Field of Classification Search ................ 361/796, 361/679, 680, 681, 683; 343/702, 725, 767, 343/770, 846
See application file for complete search history.

(56) References Cited

U.S. PATENT DOCUMENTS

| 5,677,698 | A  | * | 10/1997 | Snowdon ..................... 343/770 |
| 5,966,098 | A  | * | 10/1999 | Qi et al. ...................... 343/702 |
| 5,983,073 | A  |   | 11/1999 | Ditzik ........................ 455/11.1 |
| 6,285,328 | B1 | * | 9/2001  | Masaki et al. ............... 343/702 |
| 6,339,400 | B1 | * | 1/2002  | Flint et al. ................... 343/702 |
| 6,380,898 | B1 |   | 4/2002  | Moore et al. ............... 343/702 |
| 6,388,627 | B1 | * | 5/2002  | Masaki et al. ............... 343/702 |
| 6,424,303 | B1 | * | 7/2002  | Tsai ............................ 343/702 |
| 2003/0050091 | A1 | * | 3/2003 | Tsai et al. ................... 455/556 |

* cited by examiner

*Primary Examiner*—P. Austin Bradley
*Assistant Examiner*—Thanh S. Phan

(57) ABSTRACT

A system for promoting wireless communication. The system utilizes a computing device and an antenna. The antenna is disposed in a protected location within the computing device. However, the antenna is positioned such that the materials from which the computing device is formed do not substantially interfere with the transmission of wireless communication signals.

31 Claims, 3 Drawing Sheets

COMPUTING DEVICE HAVING AN ANTENNA

BACKGROUND OF THE INVENTION

A variety of computing devices or computer related devices, such as portable computers, tablet PCs, monitors, personal digital assistants (PDAs) and other hand held devices, have been designed for wireless communication. Typically, such devices utilize an antenna for receiving and/or transmitting wireless communication signals. Antennas have been mounted both externally and internally, but certain problems are associated with each approach.

For example, mounting an antenna externally can create a less desirable form factor as well as increasing the vulnerability of the antenna to damage from contact with external objects. On the other hand, the mounting of an antenna internal to a device housing can be problematic due to space constraints and due to interference with transmission of the wireless signal. For example, certain materials used in housing construction, such as carbon, magnesium and polycarbonate materials can limit antenna performance.

SUMMARY OF THE INVENTION

The present invention relates generally to a technique that facilitates wireless communication with a computing device. The technique utilizes deployment of the antenna in a protected location without substantially limiting antenna performance.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

The following description is of exemplary embodiments illustrating the incorporation of an antenna into a computing device. The particular devices illustrated are exemplary embodiments and representative of a variety of devices having a range of functionality, designs, styles, sizes and other form factor elements. Accordingly, the claims should not be limited to the specific configuration or functionality of the designs illustrated.

Figure 1:
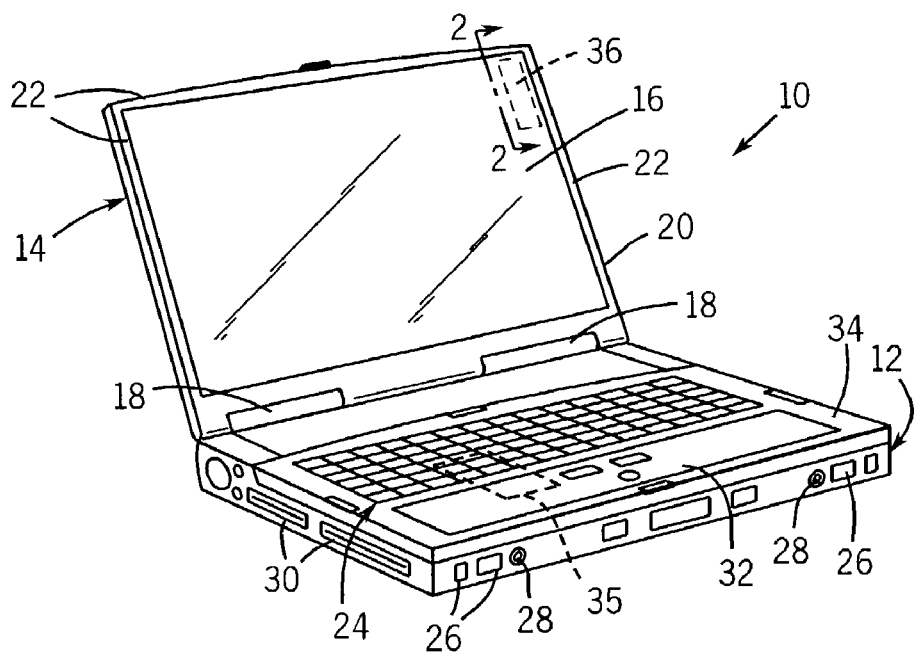
FIG. 1 is a perspective view of an exemplary computing device having an antenna, according to one embodiment of the present invention.

Referring generally to FIG. 1, an exemplary computing device 10 is illustrated. In this embodiment, computing device 10 comprises a portable computer, such as a notebook computer. The device includes a base 12 coupled to a display 14 having a display screen panel 16. In this embodiment, display 14 is pivotably coupled to base 12 by, for example, one or more hinges 18. However, in other configurations, display 14 may be secured to a base in a fixed position.

As illustrated, display 14 comprises a display housing 20 that receives display screen panel 16. Display housing 20 further comprises a front edge 22 that extends inwardly towards display screen panel 16 to create an opening or recess for receiving the display screen panel.

Base 12 comprises, for example, a keyboard 24, such as a removable keyboard that permits separation of the keyboard from the remainder of base 12. Additionally, base 12 may comprise a variety of other features, such as interactive buttons 26, ports 28, drives 30, mouse pads 32 and other features that facilitate the use or adaptability of computing device 10. The various buttons, ports, drives, etc. typically are formed in a base housing 34 that also encloses at least one microprocessor 35.

In one exemplary embodiment, display housing 20 and base housing 34 are formed from a plastic material, such as a polycarbonate material. However, display housing 20 and base housing 34 may be formed from other suitable materials, including plastics, e.g. carbon filled plastics, or from metallic materials, e.g. metal die-cast materials or magnesium. Furthermore, the display housing and base housing may be formed of dissimilar materials or various composite materials.

Figure 2:
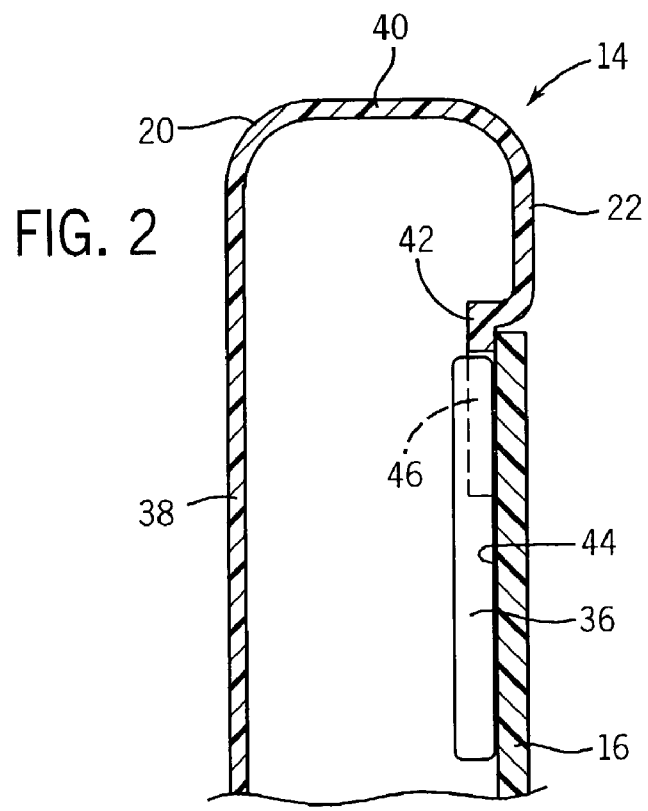
FIG. 2 is a cross-sectional view taken generally along line 2-2 of FIG. 1.

With further reference to FIG. 2, an antenna 36 is mounted within display 14. As illustrated, housing 20 of display 14 comprises a back or bottom wall 38 and a plurality of sidewalls 40. Typically, bottom wall 38 is generally parallel with display screen panel 16. Sidewalls 40 generally are connected between back wall 38 and front edge 22. Additionally, housing 20 comprises a bezel or display screen panel support region 42 designed to support display screen panel 16 at a location slightly recessed towards back wall 38 with respect to front edge 22. Antenna 36 is mounted adjacent display screen panel 16 along an interior surface 44 of the display screen panel.

Display screen panel 16 is formed from a glass material or other suitable material formulated for decreased interference with transmission of wireless signals to and/or from antenna 36. Thus, antenna 36 is disposed in a protected location without being surrounded by shielded materials that would otherwise limit antenna performance. In the particular example illustrated, a region 46 of bezel 42 is removed to permit placement of antenna 36 against interior surface 44 proximate front edge 22 without requiring passage of the wireless communication signal through the bezel material.

It should be noted that the exemplary antenna 36 is illustrated as deployed immediately beneath display screen panel 16 in an upper right-hand corner of display screen 14 when viewed from the perspective of FIG. 1. However, depending on the configuration, size, component arrangement or other design features of computing device 10, antenna 36 may be deployed in a variety of locations beneath the display screen panel 16.

Figure 3:
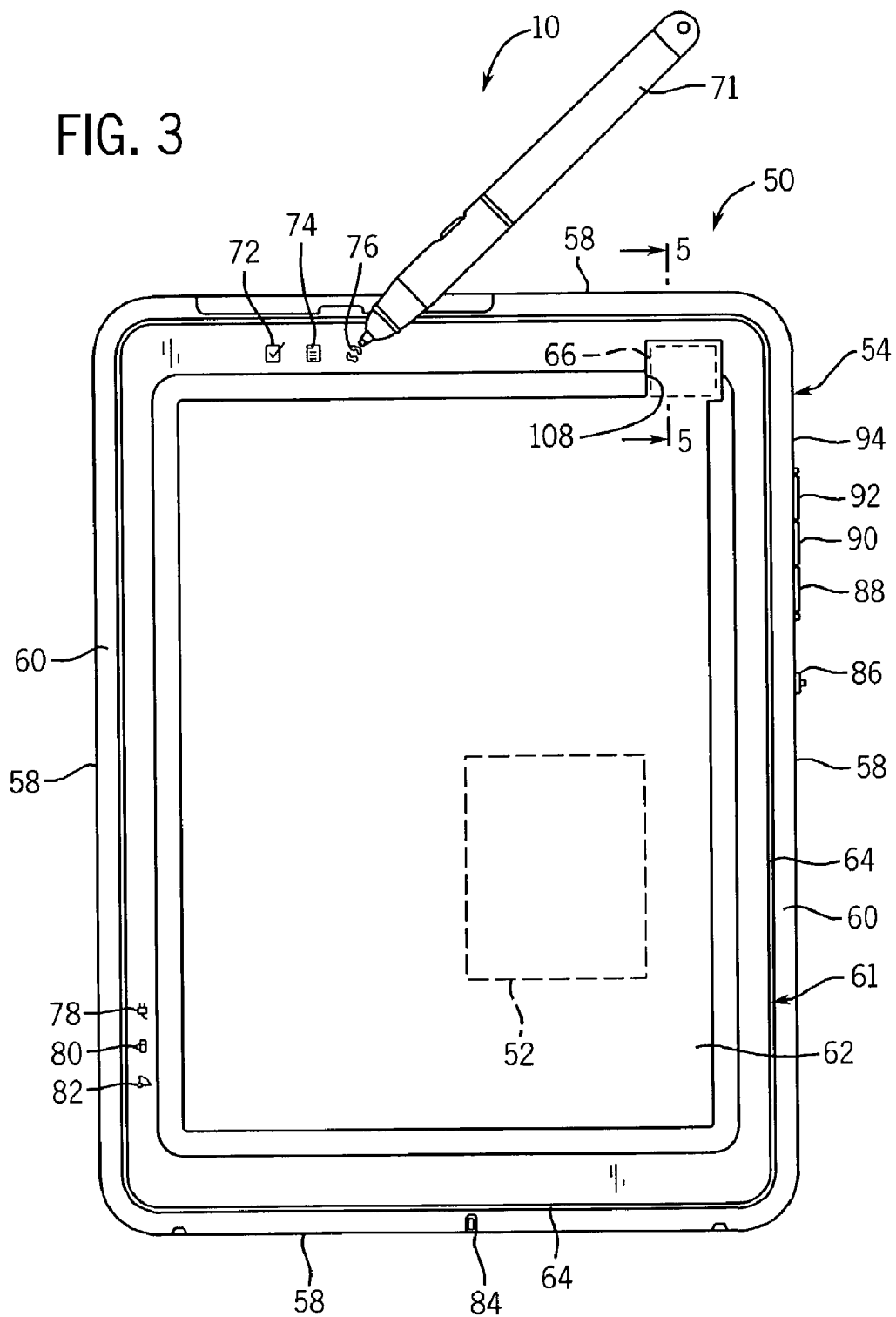
FIG. 3 is a front view of a tablet PC according to one exemplary embodiment of the present invention.
Figure 4:
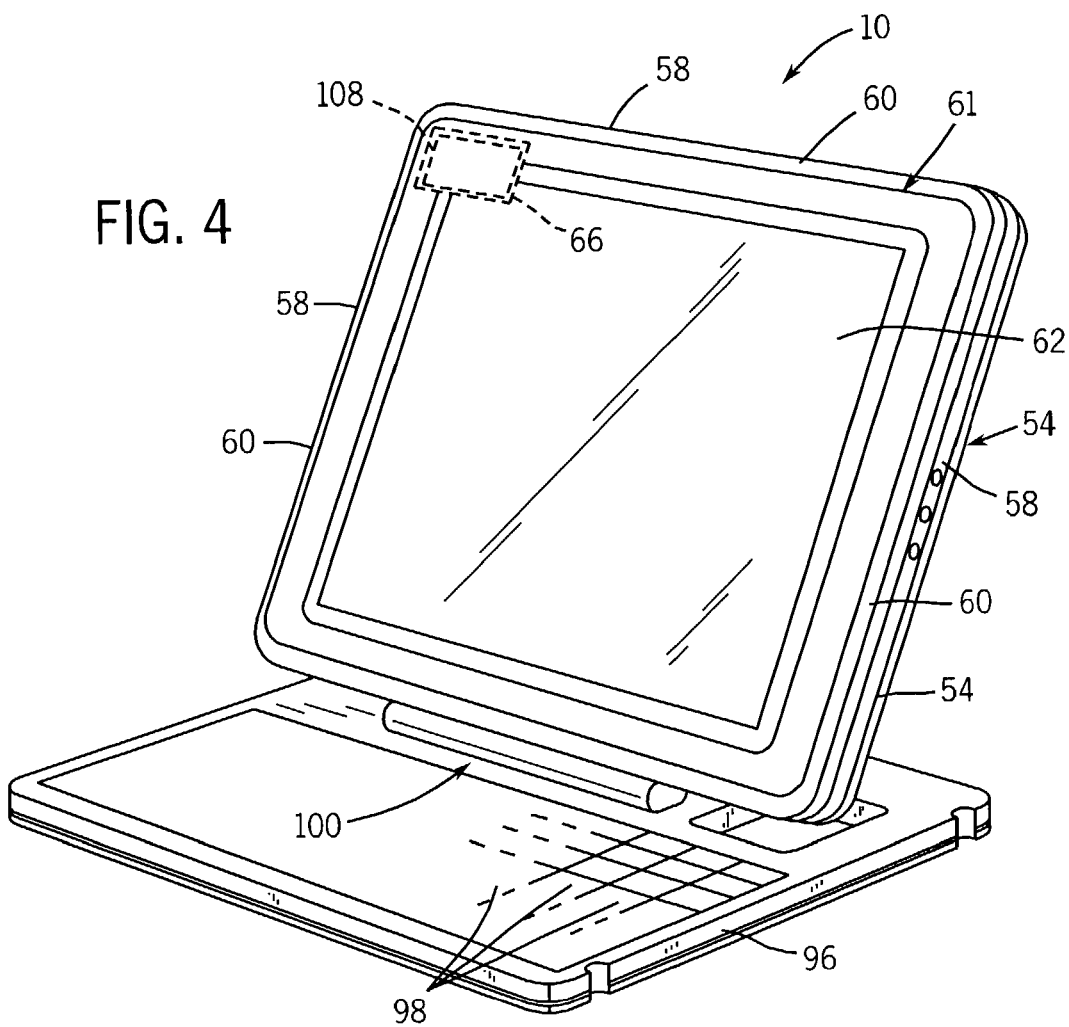
FIG. 4 is a perspective view of the computing device illustrated in FIG. 3.
Figure 5:
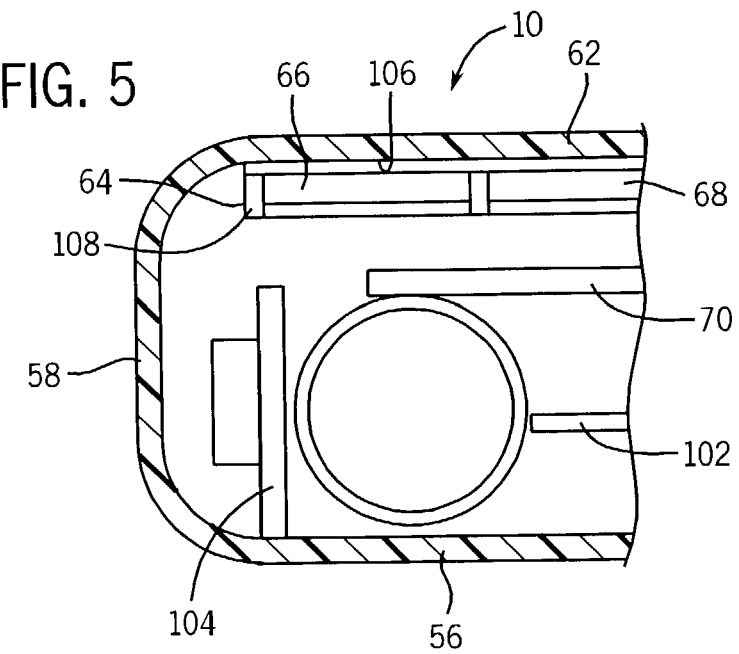
FIG. 5 is another cross-sectional view taken generally along line 5-5 of FIG. 3.

Another exemplary embodiment of a computing device incorporating a protected antenna without substantially limiting the performance of the antenna is illustrated in FIGS. 3, 4 and 5. In this embodiment, computing device 10 comprises a tablet PC 50. Tablet PC 50 is a computing device having an internal processor 52, e.g. a microprocessor.

The exemplary tablet PC comprises a housing 54 formed of a suitable material, such as a plastic or metallic material, as described above. Housing 54 has a bottom housing wall 56 (see FIG. 5) and a plurality of sidewalls 58 that each extend generally transversely from bottom housing wall 56 to a front edge or lip 60. Front edges 60 are directed inwardly towards a display 61 having a display screen panel 62. Display screen panel 62 is supported between front edges 60 by a recessed bezel region 64 located beneath at least a portion of display screen panel 62. Often, display screen panel 62 is positioned generally parallel with bottom housing wall 56. As discussed with respect to the embodiment illustrated in FIGS. 1 and 2, the display screen panel comprises a material, such as a panel of glass, that does not substantially interfere with the performance of an internal antenna 66.

Depending on various design considerations for tablet PC 50, display 61 may comprise a variety of components in addition to display screen panel 62. For example, display 61 may comprise an LCD module 68 and a digitizer board 70, as illustrated best in FIG. 5. Digitizer board 70 can be designed to interact with a digitizer pen 71 (see FIG. 3) which facilitates interaction between a user and tablet PC 50. For example, in some designs of tablet PC 50, digitizer pen 71 and digitizer board 70 cooperate to permit a user to interact with the computing device 10 by writing on display screen panel 62.

As described above, the actual design and features of a given computing device 10 may vary substantially. Accordingly, the description of various components and functions of tablet PC 50 are by way of example only. In the embodiment illustrated, tablet PC 50 comprises various digitizer-activated buttons 72, 74 and 76 that may be activated by digitizer pen 71, as illustrated best in FIG. 3. Additionally, tablet PC 50 may comprise a variety of status indicators 78, 80 and 82, such as LED illuminable icons corresponding to desired components or functionality. For example, the status indicators may correspond to wireless activity via antenna 66, an ac or dc power source, a low battery level, network connectivity, a system error, processor activity, etc. The illustrated embodiment also has a microphone 84 disposed through a portion of housing 54.

Additionally, tablet PC 50 may comprise a variety of other control buttons, such as a jog dial 86 and functional buttons 88, 90, 92 and 94. The jog dial 86 may be used to scroll through a software menu, pages of text or other displayed media. The functional buttons 88-94 may have, for example, default hardware or software functions, which the user can program to perform desired hardware or software tasks. The functional button or buttons may operate as an ESC key, a TAB key, a CRL-ALT-DEL key combination, a RETURN key, a mouse key or other standard or special keys.

Furthermore, tablet PC 50 may comprise a keyboard 96 to provide an additional interface between the user and computing device 10 (see FIG. 4). In the embodiment illustrated, housing 54 is attached to keyboard 96 in a position that allows a user to view display screen panel 62 while operating a plurality of keys 98 of keyboard 96. Depending on the desired design parameters, housing 54 and keyboard 96 may be pivotably coupled to each other by, for example, a rotational element 100 that may be in the form of a hinge, pivot, rotary disk or other rotational element. Also, display 61 may be rotatably mounted for selected "portrait" or "landscape" viewing.

Furthermore, the interior design of tablet PC 50 typically includes a main board or motherboard 102 and, potentially, other specialty printed circuit boards 104, as illustrated in FIG. 5. However, the actual architecture and components utilized can vary greatly depending on the form, style, power, portability and functionality of computing device 10.

Similar to the embodiment illustrated in FIGS. 1 and 2, antenna 66 may be deployed along an inner surface 106 of display screen panel 62 in a position unobstructed by materials containing metallics or other substances that interfere with the performance of antenna 66. Specifically, display screen panel 62 has a lower percentage of metallics and/or other interfering substances relative to the surrounding materials, e.g. the material of housing 54. As discussed above, one exemplary material from which display screen panel 62 can be formed is a glass material substantially free of metallics, carbon or other substances that interfere with the transmission of wireless communication signals therethrough.

In the design of FIGS. 3, 4 and 5, a portion 108 of bezel region 64 is removed to permit placement of antenna 66 proximate front edge 60. By removing portion 108, antenna 66 may be located proximate inner surface 106 of display screen panel 62 without being obstructed by performance limiting materials, such as the typical materials used to form housing 54 and bezel region 64. By locating the antenna towards an edge of the display 61, any interference with the full use of display 61 is substantially reduced or eliminated. However, the specific location of antenna 66 can vary according to the design of computing device 10 as well as the desired operating parameters. Movement of the antenna towards a lateral or edge position often may be accomplished by removing a portion of the bezel region, e.g. bezel region 42 or 64, to facilitate protection of the antenna while promoting performance.

Depending on the design of a given computing device 10 as well as its desired operational functionality, a variety of antenna types may be utilized to accomplish wireless communication. For example, antenna 66 may be an IEEE 802.11 standard antenna designed to process wireless signals broadcast according to the IEEE 802.11 standard. Similarly, the antenna may be designed to process wireless signals broadcast according to the IEEE 802.15 standard, Blue Tooth and/or infrared. The antenna may be designed to operate with these or other wireless communication signals.

It will be understood that the foregoing description is of exemplary embodiments of this invention, and that the invention is not limited to the specific forms shown. For example, a variety of computing devices with other form factors may incorporate the antenna system as described above; the type of antenna system and its functionality will vary according to computing device design; the components and functionality of the exemplary computing devices described above may be adapted, changed or developed according to a variety of design parameters; and the material used to form the display screen panel may be changed provided it permits the transmission of wireless signals with no substantial interference. These and other modifications may be made in the design and arrangement of the elements without departing from the scope of the invention as expressed in the appended claims.

What is claimed is:

1. A system for promoting wireless communication, comprising:
    a portable computer having a plastic housing, a transparent display screen panel mounted in the plastic housing in front of a display module, wherein the transparent display screen panel comprises an antenna oriented in a position unobstructed by the plastic housing and the display module.

2. The system as recited in claim 1, wherein the portable computer comprises a tablet PC.

3. The system as recited in claim 2, wherein the transparent display screen panel comprises a glass material.

4. The system as recited in claim 2, wherein the transparent display screen panel comprises a writing surface.

5. The system as recited in claim 1, wherein the plastic housing comprises a bottom wall and a plurality of sidewalls, the transparent display screen panel being coupled to the plurality of sidewalls in a position generally parallel with the bottom wall.

6. The system recited in claim 1, wherein the antenna is mounted on and behind the transparent display screen panel.

7. A portable computer, comprising:
a housing;
a microprocessor disposed within the housing;
a display disposed within the housing; and
a transparent display screen panel attached to the housing in front of the display, wherein the transparent display screen panel comprises an antenna disposed at a position that permits receipt of wireless signals without passage of the wireless signals through the housing and the display.

8. The portable computer as recited in claim 7, wherein the housing is a tablet PC housing.

9. The portable computer as recited in claim 7, wherein the antenna is configured to process wireless signals broadcast according to an IEEE 802.11 standard.

10. The portable computer as recited in claim 7, wherein the antenna is configured to process wireless signals broadcast according to an IEEE 802.15 standard.

11. The portable computer as recited in claim 7, wherein the housing comprises a bottom wall generally parallel to the display screen panel.

12. The portable computer as recited in claim 7, wherein the antenna is disposed on and behind the transparent display screen panel.

13. A computer display, comprising:
a display; and
a transparent display screen panel, in front of the display, comprising an antenna at a position that allows signals to pass through the transparent display screen panel to the antenna.

14. The computer display as recited in claim 13, wherein the transparent display screen panel is mounted in a housing and has a lower percentage content of metallics than the housing.

15. The computer display as recited in claim 14, wherein the housing comprises a tablet PC housing.

16. The computer display as recited in claim 15, further comprising a microprocessor disposed within the housing.

17. The computer display as recited in claim 16, further comprising a keyboard coupleable to the housing.

18. The computer display as recited in claim 13, wherein the transparent display screen panel is substantially free of metallics to reduce interference with wireless signals passing to the antenna.

19. The computer display as recited in claim 13, wherein the housing comprises a bottom wall and a plurality of sidewalls that extend from the bottom wall to the transparent display screen panel.

20. The computer display as recited in claim 13, wherein the antenna is mounted on and behind the transparent display screen panel.

21. A method of manufacturing an electronic device, comprising:
providing a housing with a base and a plurality of sidewalls;
positioning a display between the plurality of sidewalls; and
positioning a transparent display screen panel in front of the display between the plurality of sidewalls, the transparent display screen panel having an antenna in a position that limits interference of the housing and the display with signal transmission.

22. The method as recited in claim 21, wherein providing comprises providing a portable computer housing.

23. The method as recited in claim 21, wherein providing comprises providing a tablet PC housing.

24. The method as recited in claim 21, further comprising selecting a material for the transparent display screen panel having a lower metallic content than the material from which the housing is formed.

25. The method as recited in claim 24, wherein selecting comprises using a material comprising glass.

26. The method as recited in claim 21, further comprising placing a microprocessor within the housing.

27. The method as recited in claim 21, wherein the antenna is coupled to a rear surface of the transparent display screen panel.

28. A method of promoting wireless communication with a portable computer device, comprising:
mounting an antenna against an interior surface of a transparent computer display panel in front of a display.

29. The method as recited in claim 28, wherein mounting comprises locating the antenna within a tablet PC housing.

30. The method as recited in claim 29, further comprising eliminating shielding material from an area about the antenna.

31. The method as recited in claim 28, further comprising forming the transparent computer display panel from a glass material.

* * * * *